Inventors:
Walter J. Williams
Perry E. Kendall,
by Hurd + Irish
Their Attorneys.

United States Patent Office

2,952,762
Patented Sept. 13, 1960

2,952,762

BLACK BODY RADIATION SOURCE

Walter J. Williams and Perry E. Kendall, Fort Wayne, Ind., assignors to International Telephone and Telegraph Corporation Filed Dec. 5, 1957, Ser. No. 700,851

4 Claims. (Cl. 219—20)

This invention relates to black body radiation sources, i.e., sources of infrared radiation which produce no visible light.

Black body radiation sources are employed in laboratories for many testing purposes including, as a specific example, the testing of infrared detecting devices. It is desirable that such a source provide black body radiation, i.e., without visible light, through a wide range of temperatures for example, from 50° through 400° C., and it is further desirable that such temperatures be accurately maintained to within narrow limits, preferably ±0.5° C. It is further desirable that such a black body radiation source be small, simply constructed, and readily portable. Presently available black body radiation sources known to the applicants have not provided the desirable wide range of black body temperatures with the accompanying desired accuracy of control, and have further been characterized by their complexity and relatively large size.

Our invention in its broader aspects provides a black body radiation source having a body formed of metal having high heat conductivity and surface emissivity with the body having a cavity formed in a surface thereof to provide a viewing opening for the resulting radiation. Electrical heating means are disposed on the exterior of the body and adapted to be connected to a source of power, and temperature sensing means are also disposed on the exterior of the body adapted to be connected to temperature indicating means. In the preferred embodiment of our invention, the body is formed of cast iron in cylindrical form with a conical-shaped cavity formed in an end thereof. An electrical heating element is wound on the exterior surface of the body adapted to be connected to an external source of alternating current. A temperature sensing resistance element is in turn wound over the heating element with the two elements being separated by a metal shield thereby preventing inductive coupling between the two elements. The heating and temperature sensing elements may further be insulated one from the other and from the cast iron body by suitable insulating cement and the temperature sensing resistance element may be connected in circuit with an alternating current energized resistance bridge, with the heating element having a negative direct current potential bias; due to the semi-conductive properties of the insulating cement, the negative bias on the heating element provides a great increase in the leakage resistance between the heating and resistance elements. The cast iron body or core with the heating and temperature sensing elements wound thereon may further be surrounded by heat shield means including an inner layer having low heat conductivity and shock absorbing qualities, an intermediate layer having good thermal insulator properties and substantially the same expansion characteristics as the core, and an outer enclosure formed of material having good thermal conductivity.

It is accordingly an object of our invention to provide an improved black body radiation source.

Another object of this invention is to provide a black body radiation source producing black body radiation between a wide range of temperatures.

Yet another object of this invention is to provide a black body radiation source in which the temperature can be maintained with high accuracy.

A further object of this invention is to provide a black body radiation source characterized by its simplicity and extremely small size.

The above-mentioned and other features and objects of this invention and the manner of attaining them will become more apparent and the invention itself will be best understood by reference to the following description of an embodiment of the invention taken in conjunction with the accompanying drawings, wherein.

Figure 1:
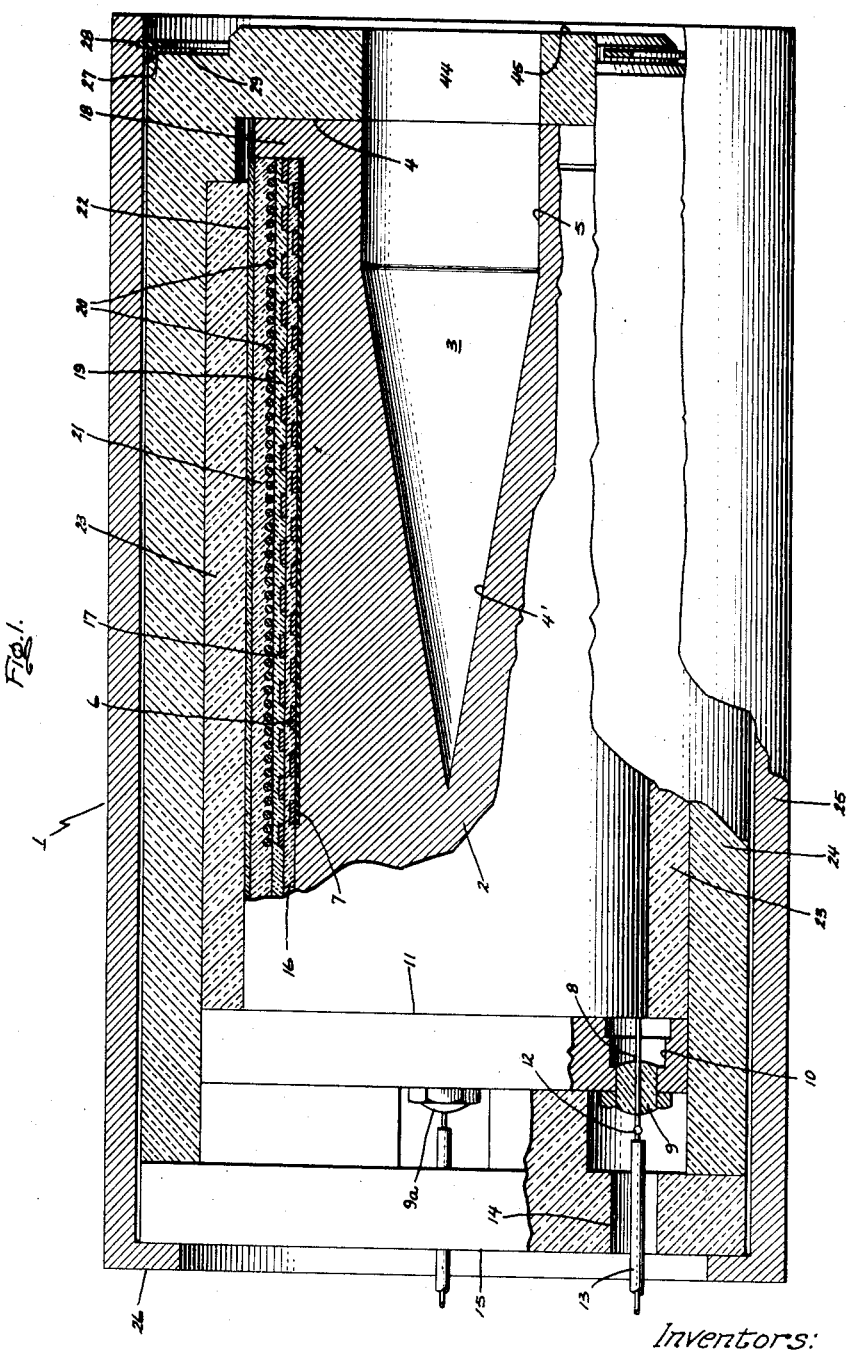
Fig. 1 is a side elevational view, partly in cross-section and partly broken away, illustrating our improved black body radiation source.

Referring now to the drawings, our improved black body radiation source, generally identified as 1, includes an inner cylindrical core 2 formed of metal having high heat conductivity and surface emissivity characteristics, preferably cast iron; cast iron is considered preferable because its oxide is very stable in the desired temperature range, i.e., 50° to 400° C. and provides a high surface emissivity (greater than 0.8), and further because of its good machineability. An axially inwardly extending cavity 3 is formed in end 4 of core 2, the cavity 3 having an inner conical portion 4' terminating in an outer cylindrical portion 5. We have found that by employing a 15° conical cavity 4', the emissivity of the core 2 is increased to better than 0.99, the start of the conical portion 4' being spaced inwardly from the end 4 by the cylindrical portion 5 in order to obtain a more even temperature distribution along the wall of the conical portion 4.

In order to provide for heating the core 2, a heating element 6, for example, formed of Nichrome ribbon, is wound over the exterior cylindrical surface of the core 2, being insulated therefrom in any suitable manner, as by a layer 7 formed of mica. The heating element 6 is adapted to be connected to an external source of alternating current power by means of leads 8 passing through insulators 9 formed of suitable high temperature material, such as glass, mounted in openings 10 in end flange 11 of core 2. Leads 8 are preferably in turn spot-welded to nickel ribbon 12 which is encased in fiberglass tubing 13 and brought out through openings 14 in end cover 15.

Heating element 6 is surrounded by a layer 16 of high temperature insulating cement, such as that sold under the trade name Sauereisen No. 7. A shield 17, which may be formed of nickel ribbon closely wound over the layer 16 of insulating cement is provided, the shield 17 being grounded to the other end flange 18 of core 2. Another layer 19 of suitable high temperature insulating cement, such as that sold under the trade name Sauereisen DW 30, surrounds the shield 17. A resistance sensing element 20, for example, formed of platinum wire, is wound over the insulating cement layer 19 with its ends being brought out by means of other feed-through insulators 9a in end flange 11 of core 2. Another layer 21 of high temperature insulating cement, such as that sold under the trade name Sauereisen DW 30, surrounds resistance heating element 20 and a final layer 22 of high temperature insulating cement, such as that sold under the trade name Sauereisen No. 29 surrounds layer 21.

It will now be seen that the heating element 6 and the resistance temperature sensing element 20 are maintained in close proximity with the grounded metal shield 17 preventing electrical coupling therebetween so that alternating current, for example, at 60 cycles, may be employed for both the heating element 6 and the temperature sensing element 20. To further reduce inductive pickup between the heating element 6 and the temperature sensing element 20, both of these elements are preferably bifilar wound.

To complete the assembly, the core 2 with the heating element 6, temperature sensing element 20, metal shield 17 and the high temperature cement layers 16, 19, 21 and 22 thereon are surrounded by a layer 23 of material having low heat conductivity and some shock absorbing qualities, such as asbestos. An outer cylindrical enclosure 24 formed of material having good thermal insulating qualities and expansion characteristics approximately the same as the core 2, such as lava, is provided, the end closure 15 also preferably being formed of the same material; the asbestos layer 23 and the lava enclosure 24 form a heat shield surrounding the inner core 2 with its heating and temperature sensing elements 6 and 20, respectively. Surrounding the entire device is outer cylindrical enclosure 25 formed of material having good thermal conductivity, such as aluminum. It will be observed that the end closure 15 abuts end flange 26 of the outer enclosure 25 and that the inner assembly is retained in the outer enclosure 25 by means of a snap ring 27 seated in an annular groove 28 in the inner wall of the outer enclosure 25 and abutting end 29 of lava cylinder 24. The outer aluminum cylinder 25 serves as a mechanical support for the black body radiation source and also as a thermal conducting layer to eliminate temperature gradients in the outer confines of the black body.

Figure 2:
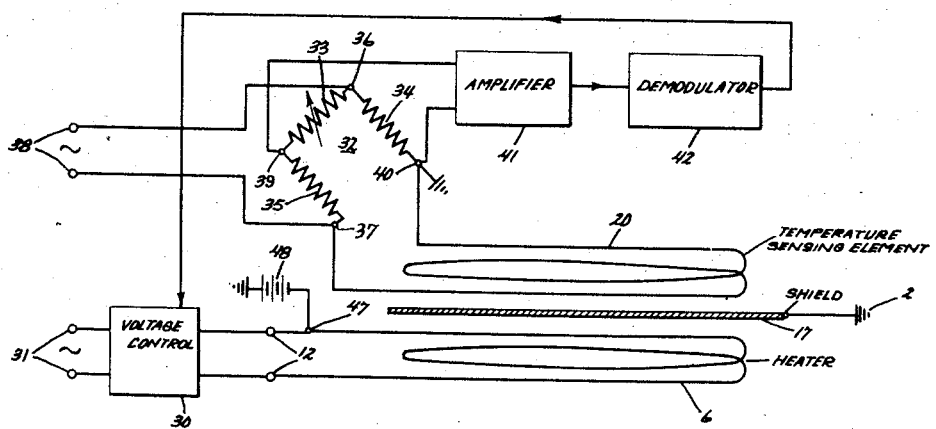
Fig. 2 is a schematic illustration showing the electrical circuitry associated with our improved black body radiation source.

Referring now particularly to Fig. 2, the preferred electrical circuitry to which the black body radiation source is connected is shown, it being understood that other circuitry may be employed. Here, the input leads 12 of the heater element 6 are connected to a voltage control unit 30, which may for example be a thyratron device, which has its input circuit adapted to be connected to an external source of alternating current (not shown), such as 120 volts, 60 cycles by leads 31. The temperature sensing resistance element 20 is connected as one leg of a resistance bridge 32 with variable resistance 33 forming the opposite leg and fixed resistance elements 34 and 35 forming the remaining legs. Input corners 36 and 37 of the resistance bridge 32 are adapted to be connected across the source of alternating current by leads 38 and the output corners 39 and 40 are connected to the input circuit of amplifier 41, which may be of any conventional design. The output circuit of the amplifier 41 is connected to a conventional demodulator 42 which in turn has its output circuit connected to control the voltage control unit 30 as shown; it will be readily seen that the combination of the amplifier 41, demodulator 42 and voltage control unit 30 form a type O feed-back servo-system. It is thus seen that with the desired temperature set by calibrated variable resistance 33 of the resistance bridge 32, deviations in that temperature as sensed by the temperature sensing element 20 will provide a signal from amplifier 41 and demodulator 42 which is applied to the voltage control unit 30 in the proper sense to raise or lower the applied voltage on the heater element 6, as the case may be, thereby to correct the temperature.

Figure 3:
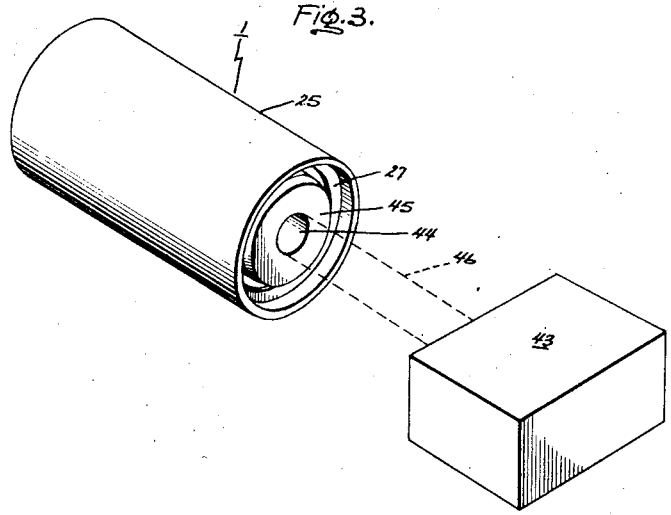
Fig. 3 is a perspective view illustrating the application of our invention.

Referring now to Fig. 3, the device 43 to be tested, which may be an infrared device, is positioned facing the opening 44 in end 45 of the lava cylinder 23 communicating with the conical cavity 3 in the black body core 2 and thus receives the black body radiation therefrom, as indicated by the dashed lines 46.

The heating element 6 is biased negatively at 47 connected to a negative source of direct current potential, shown here as being battery 48. It has been found that the insulating cement layers 16, 19, 21 and 22 have characteristics similar to semi-conductor materials and the back-biasing of the temperature heating element 6 has been found to increase the leakage resistance between the heating element 6 and the temperature sensing element 20 by a factor better than ten to one.

In an actual device constructed in accordance with this invention, the core 2 was 2.051 inches in length with its main cylindrical outer surface on which the heating and temperature sensing elements are wound being .562 inch in diameter. The opening 44 being .330 inch in diameter and the 15° conical cavity portion 4' starting inwardly .250 inch from end 4 of body 2. In this device, the mica layer 7 was .003 inch thick, the resistance heating element 6 was formed of 42 turns of .003 inch thick Nichrome ribbon bifilar wound and the layer 16 of insulating cement was .018 inch thick over the heating element 6. The shield 17 was formed of closely wound nickel ribbon .003 inch thick, the layer 19 of insulating cement was .027 inch thick, and the resistance heating element 20 was formed of 108 turns of .002 inch platinum wire bifilar wound. The outer layers 21 and 22 of insulating cement were respectively .028 and .025 inch thick. The asbestos layer 23 was .095 inch thick, the lava cylinder 24 was .155 inch thick, and the outer aluminum cylinder 25 was .125 inch thick, thereby providing a black body radiation source 1 having an overall length of 2.84 inches and an overall diameter of 1.50 inches. The insulating cements used for the layers 16, 19, 21 and 22 were those sold under the trade name Sauereisen No. 7, DW–30, DW–30 and No. 29 respectively, the Sauereisen DW–30 cement being particularly chosen because of its high resistivity at temperatures between 300° C. and 400° C.; the resistance of all insulators falls off at a very rapid rate at these elevated temperatures and the Sauereisen DW–30 was found to have as high a resistivity between these temperatures as any of the better high temperature insulators such as mica or aluminum oxide, and further, this material provided the semi-conductor phenomenon which permitted increasing the overall resistivity between the elements 6 and 20 by the back-biasing potential 48.

It will now be seen that we have provided an improved black body radiation source which can be operated through a wide temperature range with very high accuracy of control. The resistance temperature sensing element 20, which in the specific example, has a resistance of 350 ohms at 25° C. provides high sensitivity and the problem of maintaining close proximity between the heating and temperature sensing elements without excessive electrical coupling therebetween, which permits utilizing alternating current at commercial frequencies for energizing both elements, has been solved by the combination of the metal shield 17 between the windings, the bifilar winding of the elements, and the combination of the insulating cement and back-biasing of the heating element. It is also seen that this black body radiation source may be extremely small in size and of light weight, i.e., in the specific example, .50 pound, and that it is therefore readily portable. It will also be observed that both the physical construction and electrical circuitry are characterized by their simplicity and ease of assembly.

While we have described above the principles of our invention in connection with specific apparatus, it is to be clearly understood that this description is made only by way of example and not as a limitation to the scope of our invention.

What is claimed is:

1. A block body radiation source comprising: a body formed of metal having high heat conductivity and surface emissivity, said body having a cavity formed in a surface thereof thereby providing a viewing opening for said radiation; an electrical heating element disposed on the exterior of said body and adapted to be connected to a source of alternating current power; a temperature sensing resistance element disposed on the exterior of said body; means including a resistance measuring bridge connected in circuit with said resistance element and adapted to be connected to a source of alternating current power; and connections for impressing a negative direct current bias potential on said heating element.

2. A black body radiation source comprising: a cylindrical body formed of metal having high heat conductivity and surface emissivity, said body having a cavity formed in an end thereof thereby providing a viewing opening for said radiation; an electrical heating element wound on the exterior of said body and adapted to be connected to a source of alternating current power; metallic shield means surrounding said heating element and grounded to said body; a temperature sensing resistance element being wound on the exterior of said shield means, said temperature sensing element being adapted to be connected to temperature indicating means and to a source of alternating current power; and connections for impressing a negative direct current bias potential on said heating element; said resistance element insulated from said shield means and said shield means being insulated from said heating element by high temperature insulating cement whereby said negative bias on said heating element increases the leakage resistance between said resistance and heating elements due to the semi-conductor characteristics of said cement.

3. A black body radiation source comprising: a cylindrical body formed of metal having high heat conductivity and surface emissivity, said body having an axially inwardly extending conical cavity formed in an end thereof thereby providing a viewing opening for said radiation; an electrical heating element bifilar wound on the exterior of said body and adapted to be connected to a source of alternating current power; metallic shield means surrounding said heating element and grounded to said body; a temperature sensing resistance element bifilar wound on the exterior of said shield; means including a resistance measuring bridge connected in circuit with said resistance element; and connections for impressing a negative direct current bias potential on said heating element, said resistance element being insulated from said shield means and said shield means being insulated from said heating element by high temperature insulating cement having semi-conductor characteristics whereby said negative bias on said heating element increases the leakage resistance between said resistance and heating elements to the semi-conductor characteristics of said cement.

4. A black body radiation source comprising: a cylindrical body formed of cast iron, said body having an axially inwardly extending cavity formed in an end thereof thereby providing a viewing opening for said radiation, said cavity having an inner axially extending conical portion terminating in an outer cylindrical portion; an electrical heating element bifilar wound on the exterior of said body and adapted to be connected to a source of alternating current power; a metallic shield surrounding said heating element and grounded to said body; a temperature sensing resistance element bifilar wound on the exterior of said shield; means including a resistance measuring bridge connected in circuit with said resistance element and adapted to be connected to a source of alternating current power; voltage control means connected in circuit with said heating element; a servo system connected in circuit between said resistance bridge and said voltage control means for controlling the voltage applied to said heating element responsive to the temperature sensed by said resistance element; connections for impressing a negative direct current bias potential on said heating element; said resistance element being insulated from said shield means and said shield means being insulated from said heating element by insulating cement having semi-conductor characteristics whereby said negative bias of said heating element increases the leakage resistance between said resistance and heater elements due to the semi-conductor characteristics of said insulating cement; heat shield means surrounding said resistance element and comprising an inner asbestos layer and an outer cylindrical lava enclosure; and an outer cylindrical case formed of aluminum.

References Cited in the file of this patent

UNITED STATES PATENTS

| 1,715,634 | Barrett | June 4, 1929 |
| 2,713,130 | Weiller | July 12, 1955 |
| 2,769,076 | Bogdan | Oct. 30, 1956 |

OTHER REFERENCES

The Review of Scientific Instruments, January 1952, vol. 23, No. 1, pages 52–53.